United States Patent
Wang et al.

(10) Patent No.: US 12,413,777 B2
(45) Date of Patent: Sep. 9, 2025

(54) INTRA TEMPLATE MATCHING PREDICTION IN GDR PICTURES

(71) Applicant: Tencent America LLC, Palo Alto, CA (US)

(72) Inventors: Biao Wang, San Jose, CA (US); Xin Zhao, San Jose, CA (US); Lien-Fei Chen, Hsinchu (TW); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/666,684

(22) Filed: May 16, 2024

(65) Prior Publication Data
US 2024/0388734 A1  Nov. 21, 2024

Related U.S. Application Data

(60) Provisional application No. 63/467,772, filed on May 19, 2023.

(51) Int. Cl.
| | |
|---|---|
| *H04N 7/12* | (2006.01) |
| *H04N 19/11* | (2014.01) |
| *H04N 19/136* | (2014.01) |
| *H04N 19/176* | (2014.01) |
| *H04N 19/184* | (2014.01) |
| *H04N 19/593* | (2014.01) |

(52) U.S. Cl.
CPC ........... *H04N 19/593* (2014.11); *H04N 19/11* (2014.11); *H04N 19/136* (2014.11); *H04N 19/176* (2014.11); *H04N 19/184* (2014.11)

(58) Field of Classification Search
CPC .................................................... H04N 19/593
See application file for complete search history.

(56) References Cited

U.S. PATENT DOCUMENTS
2012/0106645 A1  5/2012  Lin et al.

FOREIGN PATENT DOCUMENTS
WO  2022/063538 A1  3/2022

OTHER PUBLICATIONS
International Search Report and Written Opinion received for PCT Patent Application No. PCT/US2024/029946, mailed on Aug. 7, 2024, 14 pages.

*Primary Examiner* — Y Lee
(74) *Attorney, Agent, or Firm* — ArentFox Schiff LLP

(57) ABSTRACT

In a method, a first area and a second area of a current frame is determined when the current frame is a GDR frame. The first area is independently coded and the second area is coded with dependency. When a current block in the current frame is coded by an intraTMP mode or an IBC mode, a search range of the intraTMP mode or the IBC mode is determined such that the search range is only in the first area of the current frame. A reference block is determined from a plurality of candidate reference blocks in the search range. The current block is encoded in a bitstream based on the determined reference block.

20 Claims, 9 Drawing Sheets

INTRA TEMPLATE MATCHING PREDICTION IN GDR PICTURES

INCORPORATION BY REFERENCE

The present application claims the benefit of priority to U.S. Provisional Application No. 63/467,772, "Intra Template Matching Prediction in GDR Pictures" filed on May 19, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods, and apparatuses for video encoding/decoding. In some examples, an apparatus for video encoding/decoding includes processing circuitry.

According to an aspect of the disclosure, an apparatus for video decoding is provided. The apparatus includes processing circuitry. The processing circuitry is configured to receive a bitstream including coded information of a current block in a current frame. The coded information indicates that (i) the current block is coded by an intra template matching prediction (intraTMP) mode or an intra block copy (IBC) mode and (ii) the current frame is a gradual decoding refresh (GDR) frame that includes a first area and a second area. The first area is independently coded and the second area is an area coded with dependency. The processing circuitry is configured to determine a search range of the intraTMP mode or the IBC mode such that the search range is only in the first area of the current frame. The processing circuitry is configured to determine a reference block from a plurality of candidate reference blocks in the search range. The processing circuitry is configured to reconstruct the current block based on the determined reference block.

In an example, when a first portion of an initial search range is included in the first area and a second portion of the initial search range is included in the second area, the processing circuitry is configured to determine the search range as the first portion of the initial search range that is in the first area.

In an example, when a first portion of an initial search range is included in the first area and a second portion of the initial search range is included in the second area, the processing circuitry is configured to (i) extend the first portion of the initial search range along one of a width and a height of the initial search range in the first area and (ii) determine the search range as extended first portion of the initial search range.

In an example, when a first portion of an initial search range is included in the first area and a second portion of the initial search range is included in the second area, the processing circuitry is configured to (i) replace samples of the second portion of the initial search range with right-most samples in the first portion of the initial search range and (ii) determine the search range of the intraTMP mode or the IBC mode as the initial search range in which the samples of the second portion are replaced.

In an example, the first portion of the initial search range is positioned at one of a left side, a right side, a top side, and a bottom side of the second portion of the initial search range.

In an example, the coded information indicates that the current block is coded by the intraTMP mode. When a first part of a template of the reference block is included in the first area of the current frame and a second part of the template of the reference block is included in the second area of the current frame, the processing circuitry is configured to calculate a template matching (TM) cost between the first part of the template of the reference block and a part of a template of the current block corresponding to the first part of the template of the reference block.

In an example, the coded information indicates that the current block is coded by the intraTMP mode. When a part of a template of a first candidate reference block of the plurality of candidate reference blocks is included in the second area of the current frame, the processing circuitry is configured to determine a template matching (TM) cost between the template of the first candidate reference block and a template of the current block as a maximum TM cost in TM costs between templates of the plurality of candidate reference blocks and the template of the current block.

In an example, the processing circuitry is configured to determine the plurality of candidate reference blocks in the search range. Each of the plurality of candidate reference blocks is included in the first area of the current frame. A template of each of the plurality of candidate reference blocks is included in the first area of the current frame.

According to another aspect of the disclosure, a method of video encoding is provided. In the method, a first area and a second area of a current frame is determined when the current frame is a GDR frame. The first area is independently coded and the second area is coded with dependency. When a current block in the current frame is coded by an intraTMP mode or an IBC mode, a search range of the intraTMP mode or the IBC mode is determined such that the search range is only in the first area of the current frame. A reference block is determined from a plurality of candidate reference blocks in the search range. The current block is encoded in a bitstream based on the determined reference block.

In an example, when a first portion of an initial search range is included in the first area and a second portion of the initial search range is included in the second area, the search range is determined as the first portion of the initial search range that is in the first area.

In an example, when a first portion of an initial search range is included in the first area and a second portion of the initial search range is included in the second area, the first portion of the initial search range is extended along one of a width and a height of the initial search range in the first area. The search range is determined as extended first portion of the initial search range.

In an example, when a first portion of an initial search range is included in the first area and a second portion of the initial search range is included in the second area, samples of the second portion of the initial search range are replaced with right-most samples in the first portion of the initial search range. The search range of the intraTMP mode or the IBC mode is determined as the initial search range in which the samples of the second portion are replaced.

In an example, the first portion of the initial search range is positioned at one of a left side, a right side, a top side, and a bottom side of the second portion of the initial search range.

In an example, the current block is coded by the intraTMP mode. When a first part of a template of the reference block is included in the first area of the current frame and a second part of the template of the reference block is included in the second area of the current frame, a TM cost between the first part of the template of the reference block and a part of a template of the current block corresponding to the first part of the template of the reference block is determined.

In an example, the current block is coded by the intraTMP mode. When a part of a template of a first candidate reference block of the plurality of candidate reference blocks is included in the second area of the current frame, a TM cost between the template of the first candidate reference block and a template of the current block is determined as a maximum TM cost in TM costs between templates of the plurality of candidate reference blocks and the template of the current block.

In an example, the plurality of candidate reference blocks us determined in the search range. Each of the plurality of candidate reference blocks is included in the first area of the current frame. A template of each of the plurality of candidate reference blocks is included in the first area of the current frame.

According to yet another aspect of the disclosure, a method of processing visual media data is provided. In the method, a bitstream of visual media data is processed according to a format rule. In an example, the bitstream includes coded information of a current block in a current frame. The format rule specifies that the coded information indicates that (i) the current block is coded by an intraTMP mode or an IBC mode and (ii) the current frame is a GDR frame that includes a first area and a second area, where the first area is independently coded and the second area is an area coded with dependency. The format rule specifies that a search range of the intraTMP mode or the IBC mode is determined such that the search range is only in the first area of the current frame. The format rule specifies that a reference block is determined from a plurality of candidate reference blocks in the search range. The format rule specifies that the current block is processed based on the determined reference block.

In an example, the format rule specifies that, when a first portion of an initial search range is included in the first area and a second portion of the initial search range is included in the second area, the search range is determined as the first portion of the initial search range that is in the first area.

In an example, the format rule specifies that, when a first portion of an initial search range is included in the first area and a second portion of the initial search range is included in the second area, the first portion of the initial search range is extended along one of a width and a height of the initial search range in the first area. The search range is determined as extended first portion of the initial search range.

In an example, the format rule specifies that, when a first portion of an initial search range is included in the first area and a second portion of the initial search range is included in the second area, samples of the second portion of the initial search range are replaced with right-most samples in the first portion of the initial search range. The format rule specifies that the search range of the intraTMP mode or the IBC mode is determined as the initial search range in which the samples of the second portion are replaced.

Aspects of the disclosure also provide an apparatus for video encoding. The apparatus for video encoding includes processing circuitry configured to implement any of the described methods for video encoding.

Aspects of the disclosure also provide a method for video decoding. The method includes any of the methods implemented by the apparatus for video decoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
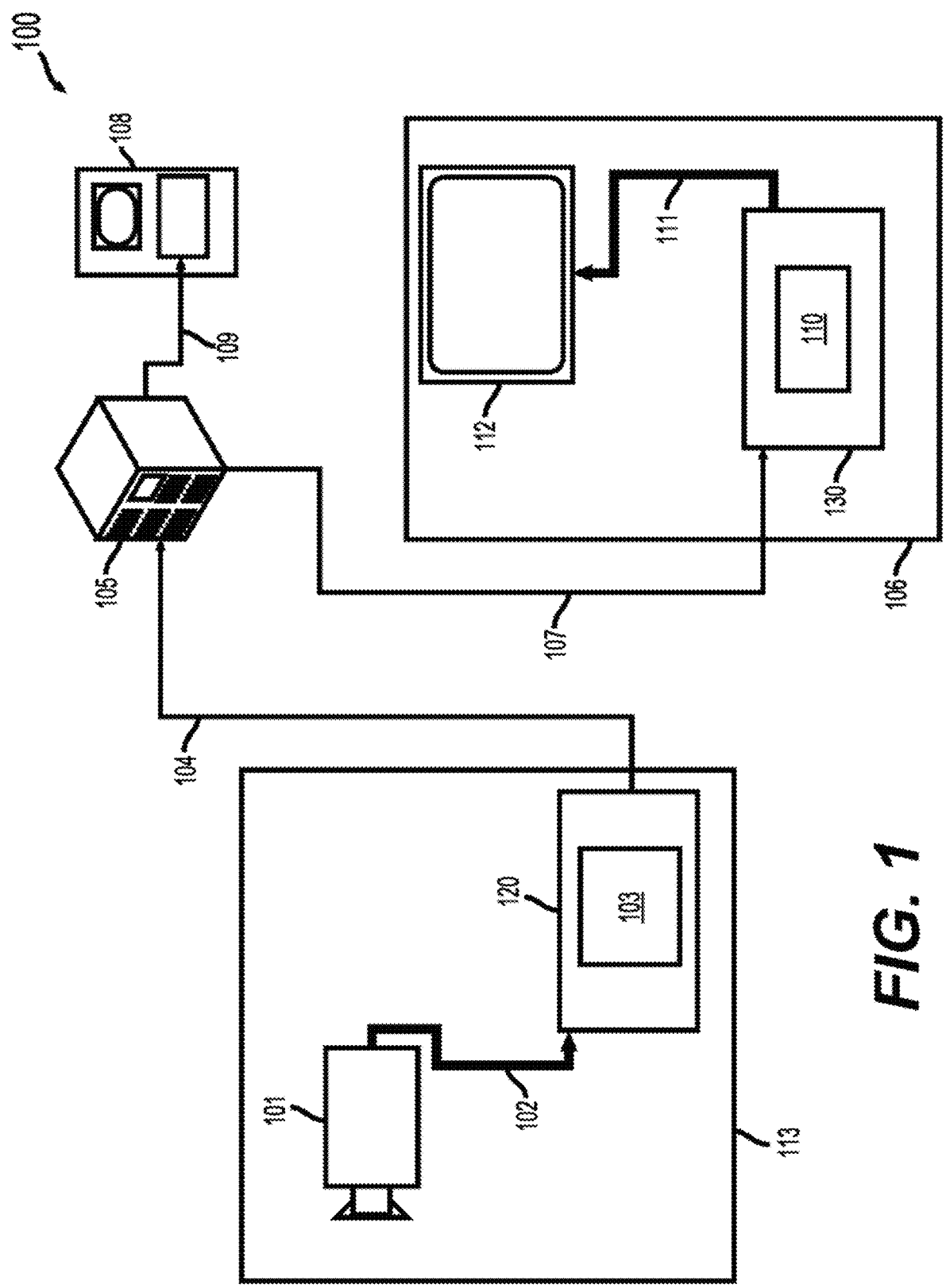
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
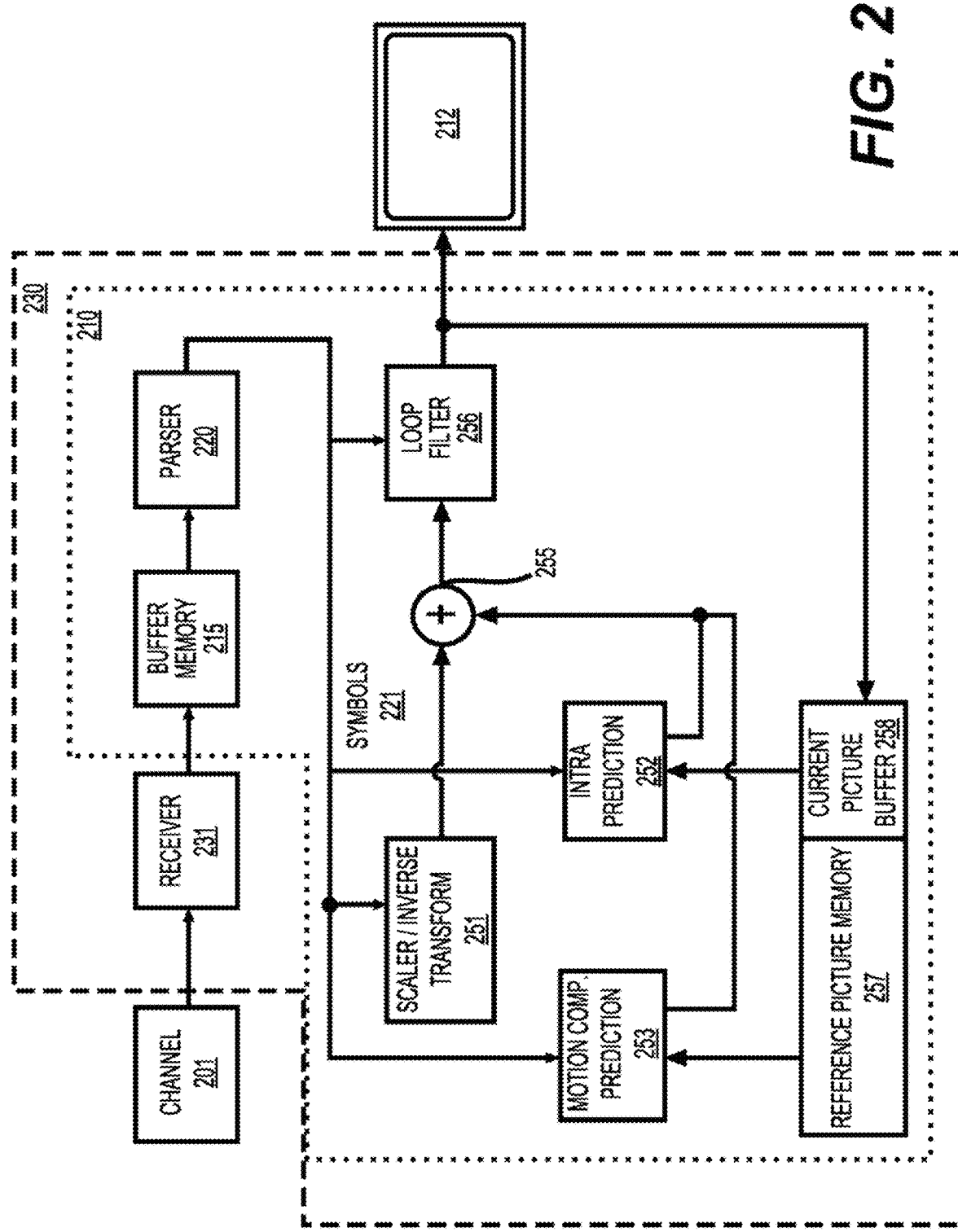
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
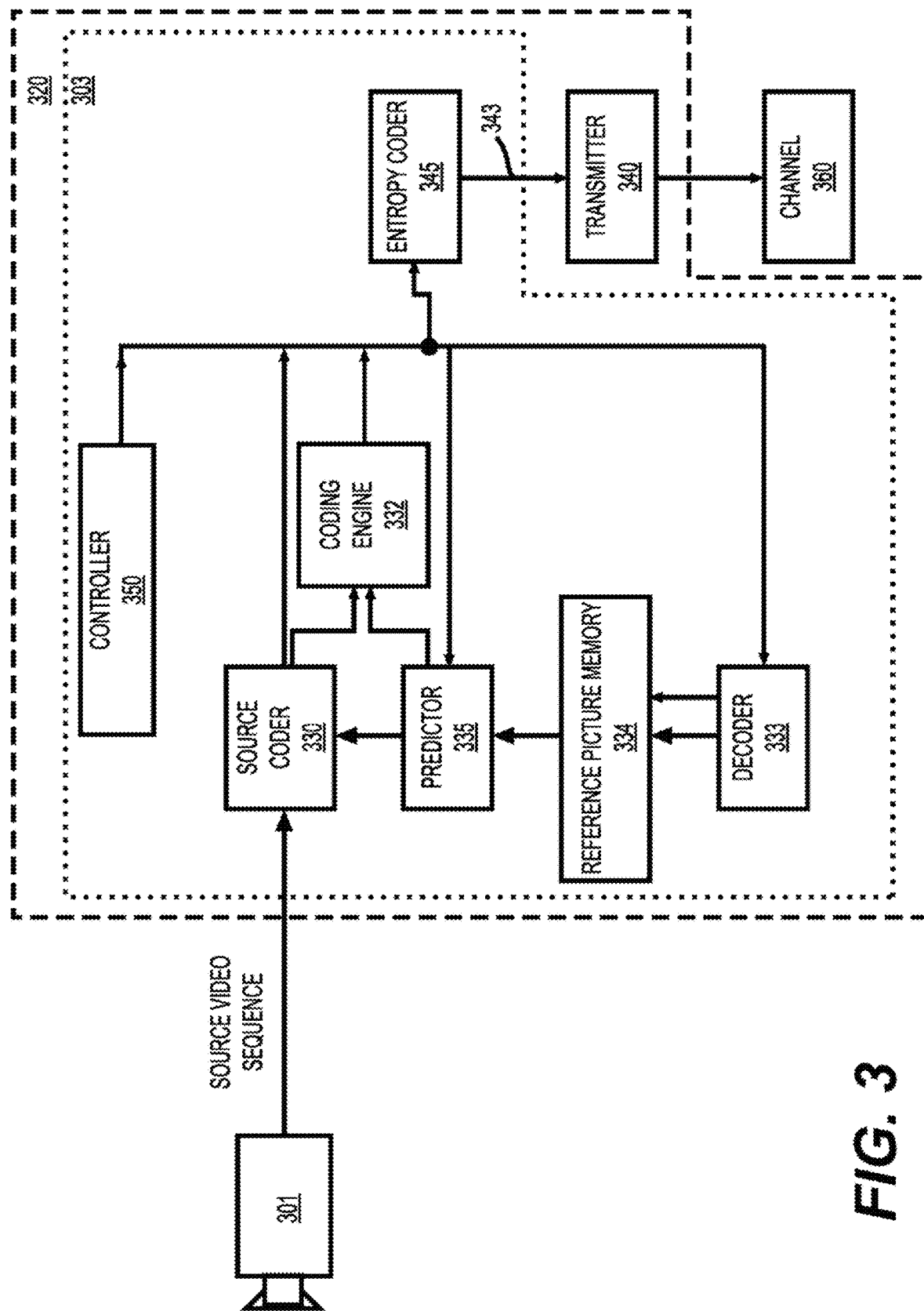
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure includes techniques for intra template matching prediction for gradual decoding refresh (GDR) pictures.

Intra template matching prediction (also referred to as intraTMP) is, for example, a special intra prediction mode that copies a best prediction block from the reconstructed part of the current frame, whose L-shaped template matches the current template (e.g., a template of a current block). For a predefined search range, the encoder may search for a most similar template to the current template in a reconstructed part of the current frame and uses the corresponding block as a prediction block, where the most similar template is associated with the corresponding block and the current template is associated with the current block. The encoder then signals the usage of the intraTMP mode, and the same prediction operation can be performed at a decoder side. A matching block (or corresponding block) (402) can be illustrated in FIG. 4 and act as the matching area for a current CU (or current block) (404).

Figure 4:
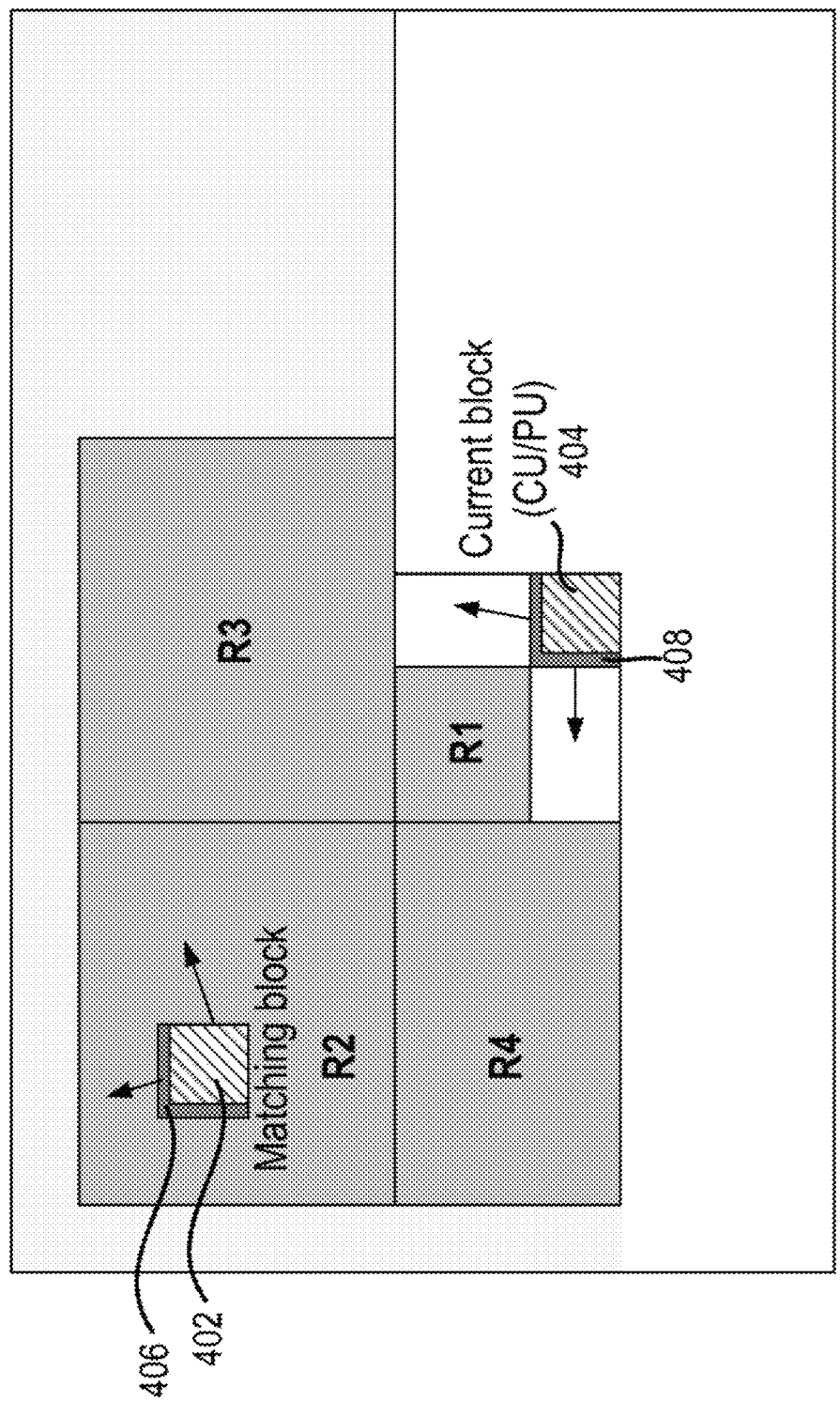
FIG. 4 is a schematic illustration of an intra template matching prediction (IntraTMP) according to some aspects of the disclosure.

As shown in FIG. 4, the prediction signal may be generated by matching the L-shaped causal neighbors (or L-shaped template) of the current block (404) with another block in a predefined search area. An example predefined search area may include R1 (a current CTU), R2 (a top-left CTU), R3 (an above CTU), and R4 (a left CTU).

In an aspect, a sum of absolute differences (SAD) is used as a cost function in IntraTMP mode. Within each search area, the decoder can search for a template (406) of a block (402) that has a least SAD with respect to the current template (408) of the current block (404) and use the block with the least SAD as a corresponding block of the current block. The corresponding block may further act as a prediction block for the current block (404).

Dimensions of all search regions (e.g., SearchRange_w, SearchRange_h) may be set proportional to a block dimension (e.g., BlkW, BlkH) of the current block. Accordingly, a fixed number of SAD comparisons may be obtained in each pixel. For example, the dimensions of a search region (or search range) may be defined in Equations 1 and 2 as follows:

$$SearchRange\_w = a * BlkW \qquad Eq. (1)$$

$$SearchRange\_h = a * BlkH \qquad Eq. (2)$$

where "a" is a constant that controls a trade-off between a gain and a complexity of the search process. In an example, "a" is equal to 5.

In an aspect, to speed up the template matching process, the search range of all search regions may be subsampled by a factor of 2. The reduced search range may lead to a reduction of template matching search by 4. After a best match is found, a refinement process may be further performed. The refinement may be performed via a second template matching search around the best match with a reduced range. The reduced range may be defined as min (BlkW, BlkH)/2.

The Intra template matching tool may be enabled for CUs with a size less than or equal to 64 in a width and a height. A maximum CU size for Intra template matching may be configurable.

In an aspect, the intra template matching prediction mode is signaled. The intra template matching prediction mode may be signaled at a CU level through a dedicated flag, for example when decoder-side intra mode derivation (DIMD) is not used for a current CU.

Comparing to an inter frame, it may be difficult to encode an intra frame because the intra frame may not have a reference picture to reduce a temporal redundancy. A compressed data size of the intra frame may be larger than the inter frame. A big size of an intra picture (or intra frame) may generate a latency issue when the intra picture is sent to a fixed data rate network, and the big size of the intra picture may furthermore generate network congestions and packet losses.

To reduce impact of an intra picture size, a real time implementation of gradual decoding refresh (GDR) frames for video encoders may be applied. The idea is to spread intra data along the inter frames. An example of the implementation of GDR frame is shown in FIG. 5.

Figure 5:
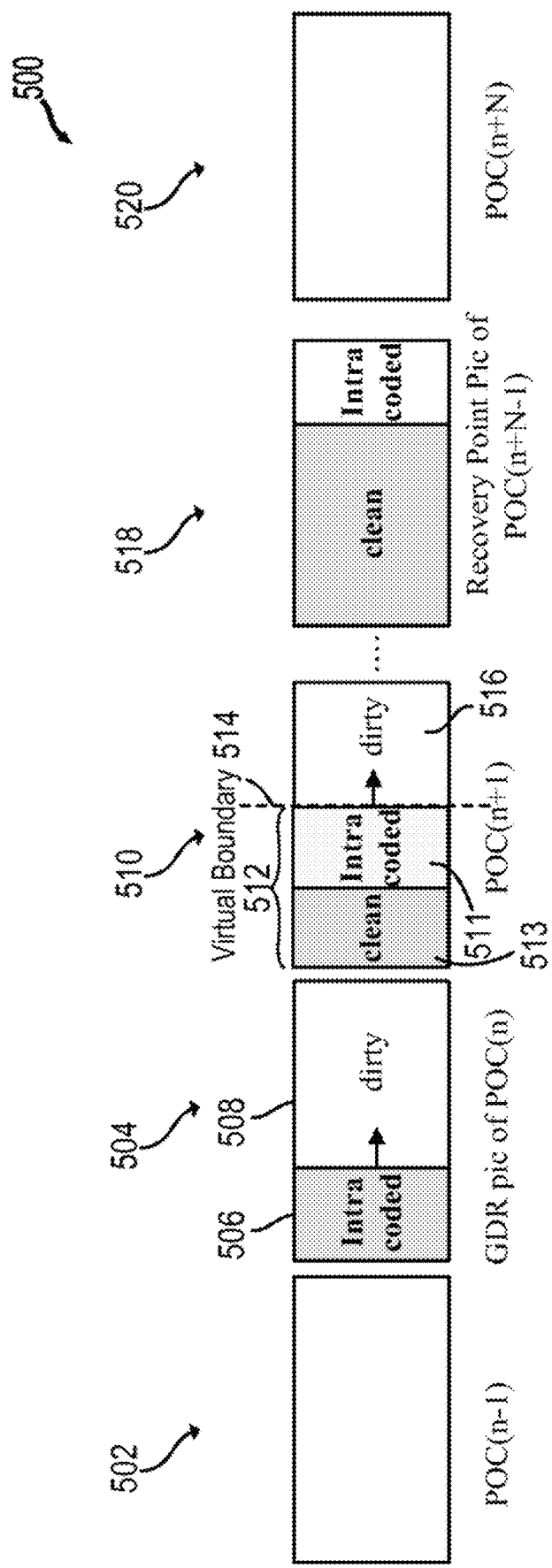
FIG. 5 is a schematic illustration of a gradual decoding refresh (GDR) frame according to some aspects of the disclosure.

As shown in FIG. 5, a GDR period (or implementation of GDR frame) (500) is provided to generate a GDR frame (or picture) that have two areas divided by a virtual boundary: a clean area and a dirty area. In an example, the clean area is an area that is coded independently and is not dependent on coded information (e.g., temporal or spatial coded information) of previously coded blocks. The dirty area is coded with dependency, such as dependent on the coded information (e.g., temporal or spatial coded information) of the previously coded blocks. The GDR period (500) may start with an initial GDR frame (502) that has a picture order count (POC) of n−1. The GDR period (500) may then proceed to a first GDR frame (504) with a POC of n. In the first GDR frame (504), one area (506) of the first GDR frame (504) may be intra coded and decoded independently, while the other area (508) is 'dirty' in that a decoder may not be able to decode the other area (508). Afterwards, the GDR period (500) proceeds to a second GDR frame (510) with a POC of n+1. In the second GDR frame (510), an intra coded area (511) is shifted to the right of the frame (510). A virtual boundary (514) may divide the second GDR frame (510) into two parts: a left part (512) of the virtual boundary (514) that is a clean area and a right part (516) of the virtual boundary (514) that is a dirty area. The area (512) at the left side of the virtual boundary (514) may include an inter coded area (513) and the intra coded area (511). The inter coded area (513) may refer to the intra coded area (506) of the first GDR frame (504) with an inter prediction, therefore the inter coded area (513) may also be a clean area. When the virtual boundary (514) moves to the right over (or across) a couple of frames (in an example N), an entire frame (518) with POC of n+N−1 may be decodable. The frame (518) may be defined as a recovery point. The recovery point may be denoted as POC (n+N−1). Subsequent pictures to the recovery point in an output order may be correctly decoded. For example, a subsequent frame (520) with a POC of n+N may be decoded correctly.

GDR may provide several desirable features, such as bitrate smoothing, maintaining intra data bitrate under control, low delay, and natural error resilience that limits a temporal error propagation along frames. For manufacturers (or designers) of a video encoder, the feature of the natural error resilience may be considered as a mandatory for real-life applications.

A key difference in a random-access support between VVC and HEVC may be related to GDR. In VVC, GDR is specified to affect a required decoding process rather than is defined only as a metadata property indication. However, in HEVC, GDR is defined only as a metadata property indication. Using the GDR feature, decoding a bitstream may start from an inter-coded picture, where only a region of the inter-coded picture may be correctly decoded without referring to previous pictures. When a decoding process starts with decoding a GDR picture, some areas of the GDR picture may not be correctly decoded. However, after a few additional pictures (e.g., from the frame (510) to the frame (518)) are decoded, a recovery point may be obtained. A time period of decoding the additional pictures may be defined as a recovery period. A picture associated with the recovery point (e.g., the frame (518) in FIG. 5) and subsequent pictures (e.g., the frame (520)) to the recovery point in an output order may be correctly decoded.

For VVC GDR, "exact match" is required at recovery points. Based on the exact match, reconstructed pictures at recovery points of an encoder and reconstructed pictures at recovery points of a decoder should be identical (or matched). To achieve the exact match, coding units (CUs) in clean areas may not use any coding information (e.g., reconstructed pixels, a code mode, a motion vector (MV), a reference picture index (refIdx), a reference picture list (refList), etc.) from dirty areas, because the coding information in the dirty areas may not be decoded correctly at the decoder.

Figure 6:
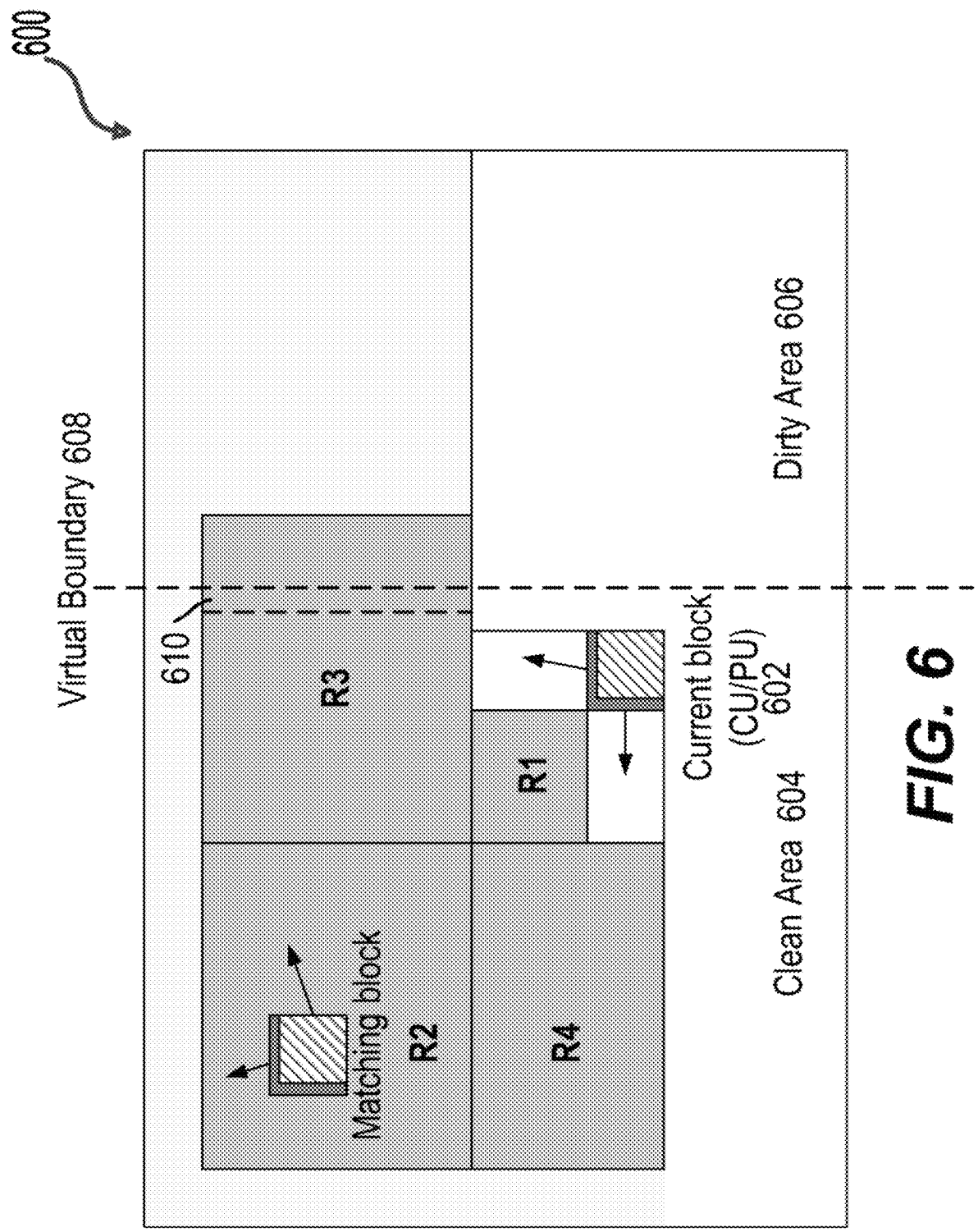
FIG. 6 is a schematic illustration of an example a reference area of an intraTMP that includes samples in a dirty area of a GDR picture.

In related examples, a search area of an intraTMP may overlap with a dirt area of a GDR picture. An example of overlapping between a search area of an intraTMP and a dirty area of a picture is shown in FIG. 6. As shown in FIG. 6, the search area R3 of the intraTMP for the current block (or coding block) (602) in the clean area (604) of the GDR picture (600) may overlap with the dirty area (606) in the GDR picture (600). When a part of reference samples or all the reference samples is chosen from the dirty area (606), the coding block (602) in the clean area (604) may not be decoded independently, which is contradict with motivation of GDR.

In the disclosure, methods are provided to ensure (or define) a reference area (or search area) of an intraTMP in a clean area and not be chosen from a dirty area. For example, a reference area of an intraTMP is only defined in a clean area of a GDR picture (or GDR frame) and is not included in a dirty area of the GDR picture. In an aspect, the clean area is coded independently and the dirty area is coded with dependency. For example, coding the clean area is not dependent on coded information (e.g., temporal or spatial coded information) of previously coded blocks, and coding the dirty area is dependent on the coded information (e.g., temporal or spatial coded information) of the previously coded blocks.

In an aspect, methods of the disclosure also apply to an intra block copy (IntraBC or IBC). For example, the methods are provided to ensure that a reference area (or search area) of the IBC is only in a clean area of a picture (e.g., a GDR picture).

In an aspect, an intraTMP search area of a coding block is ensured (or defined) in a clean area that does not include samples from a dirty area. In other words, the intraTMP prediction is not dependent on the dirty area.

In an aspect, when an intraTMP search area of a coding block in a clean area is overlapped with a dirty area, samples from the dirty area are excluded by restricting the intraTMP search range in the clean area only. For example, as shown in FIG. 6, the R3 area of the intraTMP includes samples in the clean area (604) and samples in the dirty area (606). The samples of the R3 area in the dirty area (606) are excluded from the search area of the intraTMP.

In an aspect, when samples are excluded from a dirty area, a search area of an intraTMP is extended in a clean area of a GDR picture to compensate reduction of the search range (or search area) of the intraTMP in the dirty area.

In an example, the search area (or search range) of the intraTMP is extended in a height of the search area in the clean area. In an example of FIG. 6, the search area of the intraTMP may be extended by increasing a height of the R2 area and/or a height of the R3 area toward a top boundary of the GDR picture (600) in the clean area (604).

In an example, the search area (or search range) of the intraTMP is extended in a width of the search area in the clean area. In an example of FIG. 6, the search area of the intraTMP is extended by increasing a width of the R2 area and/or a width of the R4 area toward a left boundary of the GDR picture (600) in the clean area (604).

In an aspect, samples in a dirty area are padded (e.g., copied or replaced) by samples in a clean area, such as right most samples in the clean area. In an example of FIG. 6, samples of the R3 area in the dirty area (606) may be replaced by samples in the clean area (604), such as replaced by samples (610) in the clean area (604) along the virtual boundary (608).

In an aspect, a combination the extension of the search area in the clean area and replacement of the samples in the dirty area with samples in the clean area is used to compensate the search range reduction of the intraTMP in the dirty area.

In an aspect, a search area Ri (e.g., R3 in FIG. 6) that includes samples from a dirty area is discarded during an intraTMP searching procedure. In an aspect, the search area Ri is one of a plurality sub search areas in the intraTMP. In an example, a portion of the search area Ri that is in the dirty area is excluded during the intraTMP searching procedure.

FIG. 6 shows an example of a pair of a clean area (604) and a dirty area (606) that is a left and right pair in the picture (600). In other words, the clean area (604) is positioned at a left side of the virtual boundary (608) and the dirty area (606) is positioned at a right side of the virtual boundary. However, FIG. 6 is merely an example. In an aspect, a pair of a clean area and a dirty area is not limited to be the left and right pair. The pair of the clean area and the dirty area may be one of a right and left pair, a top and bottom pair, and a bottom and top pair. In an aspect, the search area of the intraTMP is positioned at one of a top right, a bottom right, a top left, and a bottom left of the current block.

In an aspect, restriction of an intraTMP search area for a dirty area is achieved (or implemented) by a video standard conformance condition. In other words, it may be a responsibility of an encoder to ensure the restriction of the intraTMP search area. When such a restriction is invalid, a generated bitstream may not be considered as a valid video standard compliant bitstream. In an example, the encoder defines the search area of the intraTMP in the encoder side according to the restriction. The encoder may also signal the defined search area to a decoder. The decoder may not need to define the search area of the intraTMP in the decoder side again.

In an aspect, limitations of the search range (or search area) of the intraTMP described above are applied on a reference block (or candidate reference block) only. In other words, when a template of the reference block is in a dirty area, the intraTMP may still be applied to derive a templating matching cost between the template of the reference block and a template of a current block.

In an example, when a part of the template of the candidate reference block is in the dirty area, only samples of the template that are in a clean area are used to measure (or calculate) the template matching cost.

In an example, the template matching cost is set as a maximum distortion value or an invalid value when the template of the reference block includes the sample from the dirty area.

In an aspect, the limitations on the search range described above are applied on both a reference block and a template area associated with the reference block. In an example, when a search position candidate (or a candidate reference block) is defined within a clean area, both the reference block and the template area associated with the reference block need to be located in the clean area.

Figure 7:
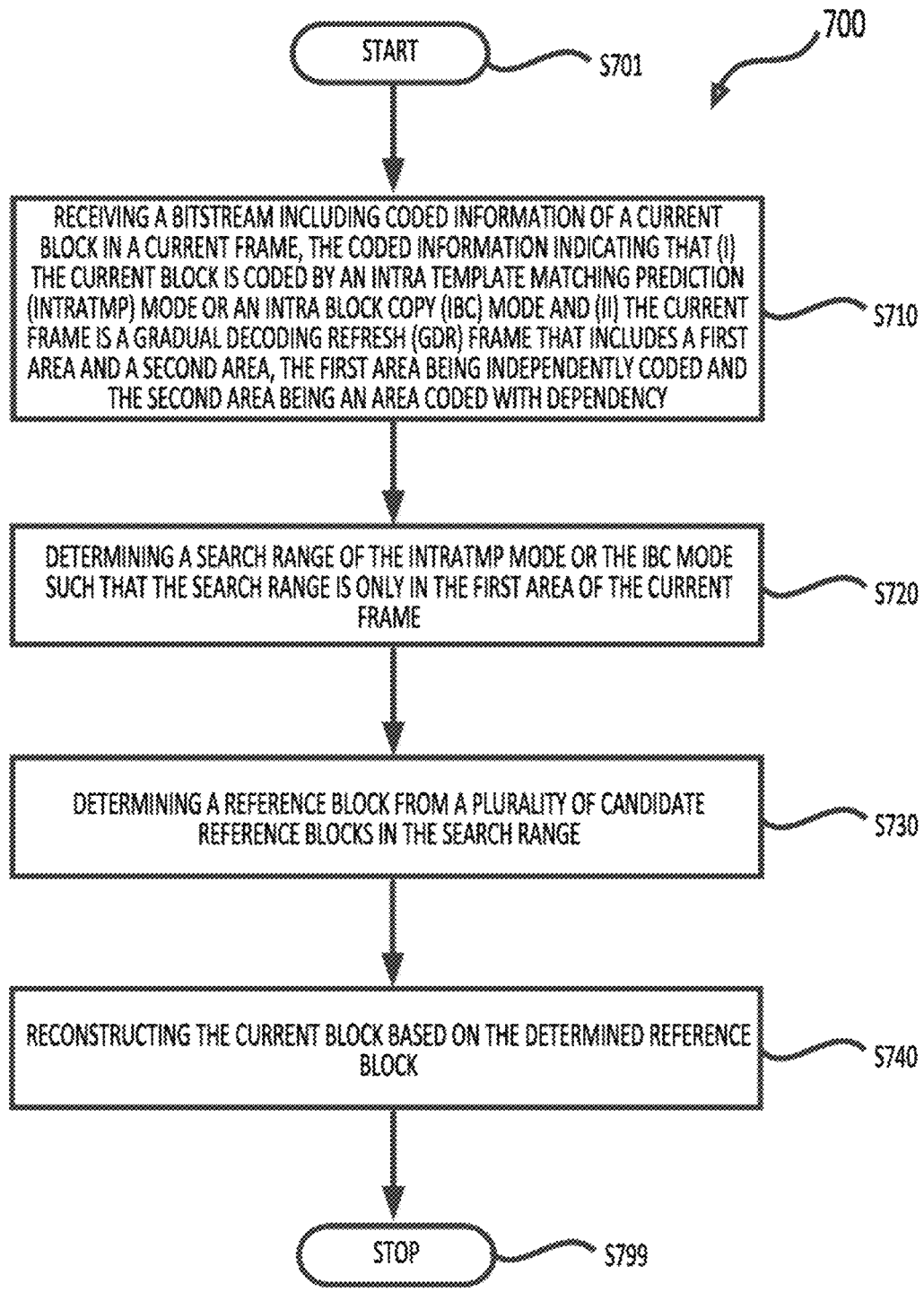
FIG. 7 shows a flow chart outlining a decoding process according to some aspects of the disclosure.

FIG. 7 shows a flow chart outlining a process (700) according to an aspect of the disclosure. The process (700) can be used in a video decoder. In various aspects, the process (700) is executed by processing circuitry, such as the processing circuitry that performs functions of the video decoder (110), the processing circuitry that performs functions of the video decoder (210), and the like. In some aspects, the process (700) is implemented in software instructions, thus when the processing circuitry executes the software instructions, the processing circuitry performs the process (700). The process starts at (S701) and proceeds to (S710).

At (S710), a bitstream including coded information of a current block in a current frame is received. The coded information indicates that (i) the current block is coded by an intra template matching prediction (intraTMP) mode or an intra block copy (IBC) mode and (ii) the current frame is a gradual decoding refresh (GDR) frame that includes a first area and a second area. The first area is independently coded and the second area is an area coded with dependency.

At (S720), a search range of the intraTMP mode or the IBC mode is determined such that the search range is only in the first area of the current frame.

At (S730), a reference block is determined from a plurality of candidate reference blocks in the search range.

At (S740), the current block is reconstructed based on the determined reference block.

In an example, when a first portion of an initial search range is included in the first area and a second portion of the initial search range is included in the second area, the search range is determined as the first portion of the initial search range that is in the first area.

In an example, when a first portion of an initial search range is included in the first area and a second portion of the initial search range is included in the second area, the first portion of the initial search range is extended along one of a width and a height of the initial search range in the first area and the search range is determined as extended first portion of the initial search range.

In an example, when a first portion of an initial search range is included in the first area and a second portion of the initial search range is included in the second area, samples of the second portion of the initial search range are replaced with right-most samples in the first portion of the initial search range and the search range of the intraTMP mode or the IBC mode is determined as the initial search range in which the samples of the second portion are replaced.

In an example, the first portion of the initial search range is positioned at one of a left side, a right side, a top side, and a bottom side of the second portion of the initial search range.

In an example, the coded information indicates that the current block is coded by the intraTMP mode. When a first part of a template of the reference block is included in the first area of the current frame and a second part of the template of the reference block is included in the second area of the current frame, a TM cost between the first part of the template of the reference block and a part of a template of the current block corresponding to the first part of the template of the reference block is calculated.

In an example, the coded information indicates that the current block is coded by the intraTMP mode. When a part of a template of a first candidate reference block of the plurality of candidate reference blocks is included in the second area of the current frame, a TM cost between the template of the first candidate reference block and a template of the current block is determined as a maximum TM cost in TM costs between templates of the plurality of candidate reference blocks and the template of the current block.

In an example, the plurality of candidate reference blocks is determined in the search range. Each of the plurality of candidate reference blocks is included in the first area of the current frame. A template of each of the plurality of candidate reference blocks is included in the first area of the current frame.

Then, the process proceeds to (S799) and terminates.

The process (700) can be suitably adapted. Step(s) in the process (700) can be modified and/or omitted. Additional step(s) can be added. Any suitable order of implementation can be used.

Figure 8:
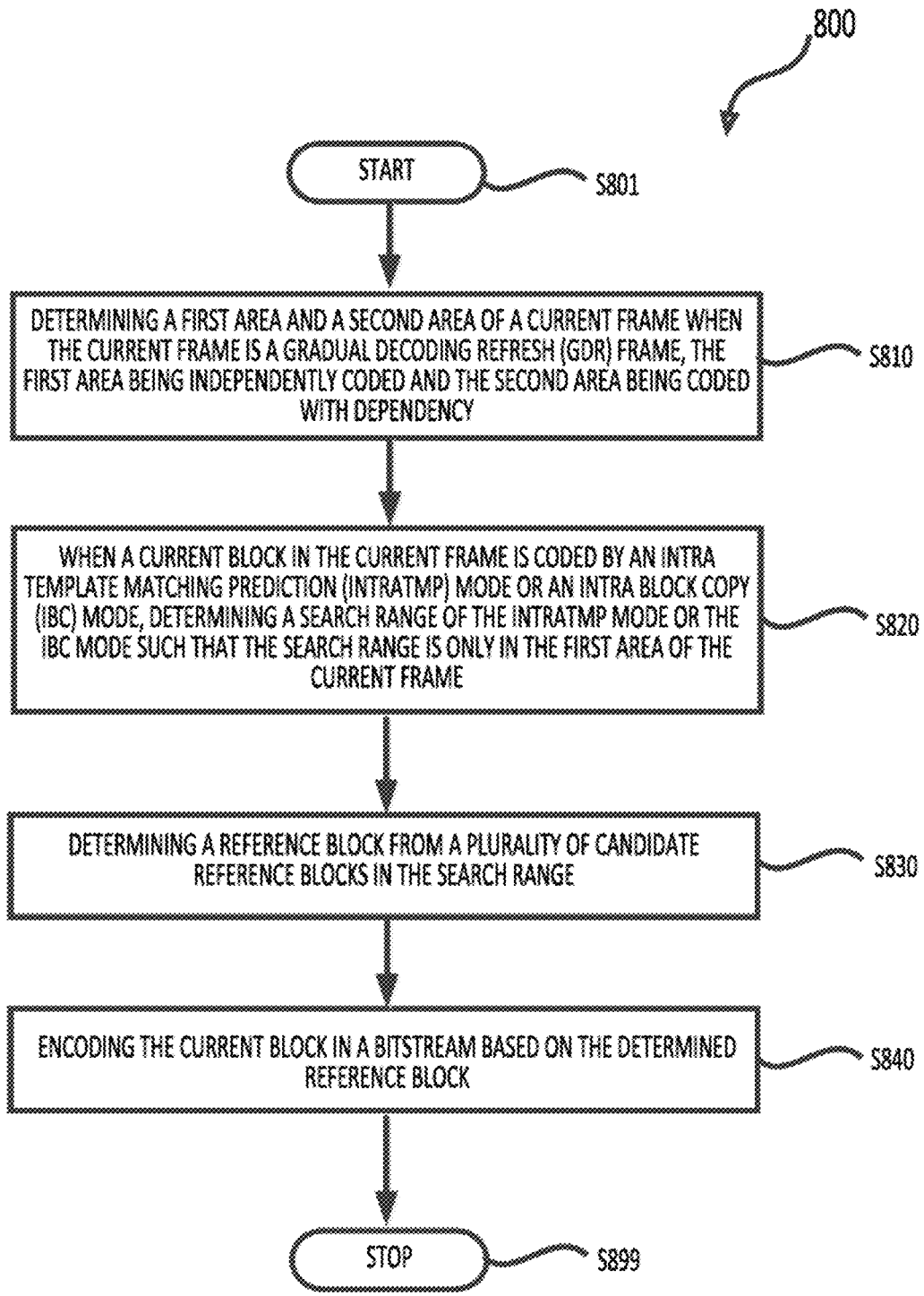
FIG. 8 shows a flow chart outlining an encoding process according to some aspects of the disclosure.

FIG. 8 shows a flow chart outlining a process (800) according to an aspect of the disclosure. The process (800) can be used in a video encoder. In various aspects, the process (800) is executed by processing circuitry, such as the processing circuitry that performs functions of the video encoder (103), the processing circuitry that performs functions of the video encoder (303), and the like. In some aspects, the process (800) is implemented in software instructions, thus when the processing circuitry executes the software instructions, the processing circuitry performs the process (800). The process starts at (S801) and proceeds to (S810).

At (S810), a first area and a second area of a current frame is determined when the current frame is a GDR frame. The first area is independently coded and the second area is coded with dependency.

At (S820), when a current block in the current frame is coded by an intraTMP mode or an IBC mode, a search range of the intraTMP mode or the IBC mode is determined such that the search range is only in the first area of the current frame.

At (S830), a reference block is determined from a plurality of candidate reference blocks in the search range.

At (S840), the current block is encoded in a bitstream based on the determined reference block.

In an example, when a first portion of an initial search range is included in the first area and a second portion of the initial search range is included in the second area, the search range is determined as the first portion of the initial search range that is in the first area.

In an example, when a first portion of an initial search range is included in the first area and a second portion of the initial search range is included in the second area, the first portion of the initial search range is extended along one of a width and a height of the initial search range in the first area. The search range is determined as extended first portion of the initial search range.

In an example, when a first portion of an initial search range is included in the first area and a second portion of the initial search range is included in the second area, samples of the second portion of the initial search range are replaced with right-most samples in the first portion of the initial search range. The search range of the intraTMP mode or the IBC mode is determined as the initial search range in which the samples of the second portion are replaced.

In an example, the first portion of the initial search range is positioned at one of a left side, a right side, a top side, and a bottom side of the second portion of the initial search range.

In an example, the current block is coded by the intraTMP mode. When a first part of a template of the reference block is included in the first area of the current frame and a second part of the template of the reference block is included in the second area of the current frame, a TM cost between the first part of the template of the reference block and a part of a template of the current block corresponding to the first part of the template of the reference block is determined.

In an example, the current block is coded by the intraTMP mode. When a part of a template of a first candidate reference block of the plurality of candidate reference blocks is included in the second area of the current frame, a TM cost between the template of the first candidate reference block and a template of the current block is determined as a maximum TM cost in TM costs between templates of the plurality of candidate reference blocks and the template of the current block.

In an example, the plurality of candidate reference blocks us determined in the search range. Each of the plurality of candidate reference blocks is included in the first area of the current frame. A template of each of the plurality of candidate reference blocks is included in the first area of the current frame.

Then, the process proceeds to (S899) and terminates.

The process (800) can be suitably adapted. Step(s) in the process (800) can be modified and/or omitted. Additional step(s) can be added. Any suitable order of implementation can be used.

In an aspect, a method of processing visual media data includes processing a bitstream of the visual media data according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of a current block in a current frame. The format rule specifies that the coded information indicates that (i) the current block is coded by an intraTMP mode or an IBC mode and (ii) the current frame is a GDR frame that includes a first area and a second area, where the first area is independently coded and the second area is an area coded with dependency. The format rule specifies that a search range of the intraTMP mode or the IBC mode is determined such that the search range is only in the first area of the current frame. The format rule specifies that a reference block is determined from a plurality of candidate reference blocks in the search range. The format rule specifies that the current block is processed based on the determined reference block.

The techniques described above, can be implemented as computer software using computer-readable instructions and physically stored in one or more computer-readable media. For example, FIG. 9 shows a computer system (900) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
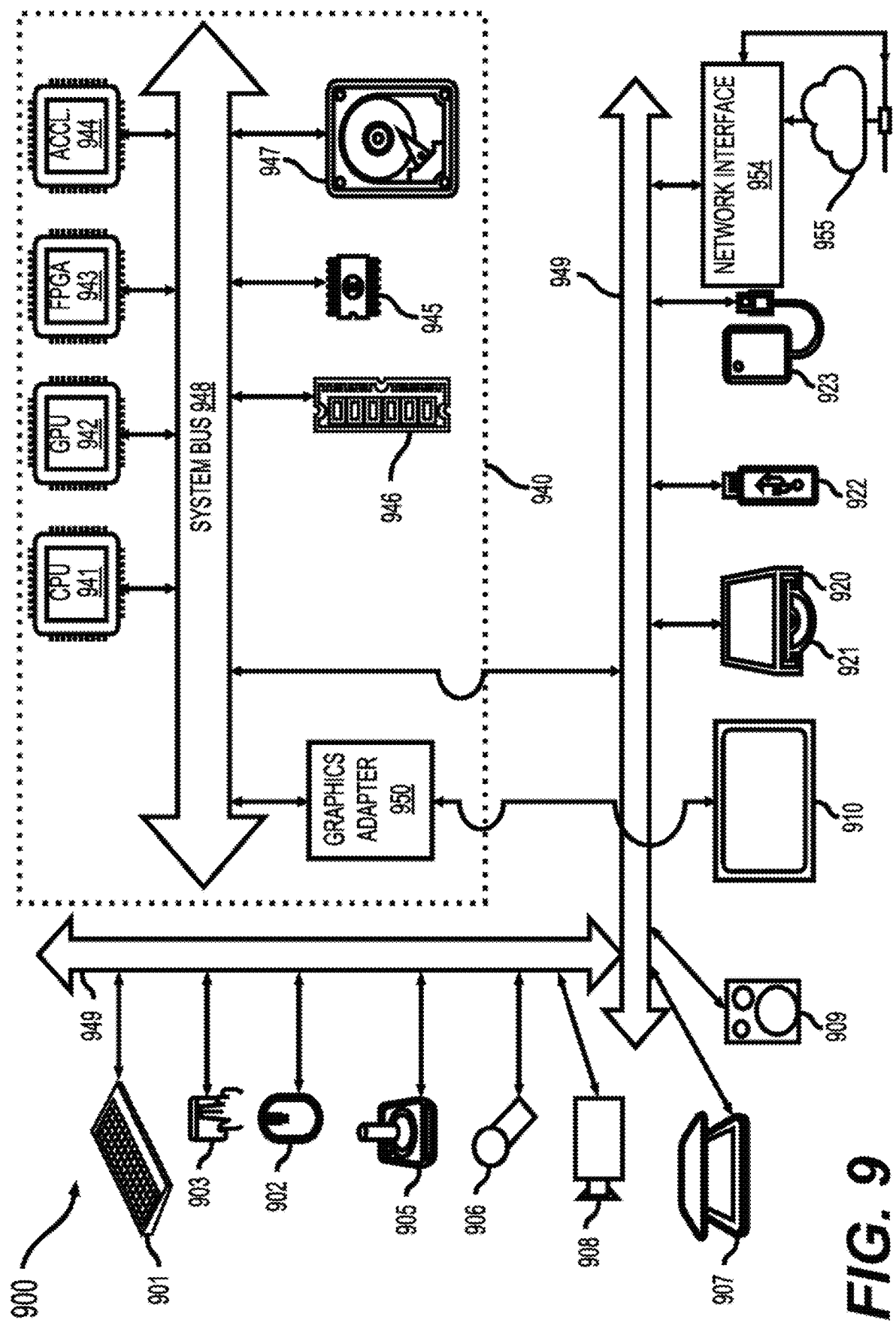
FIG. 9 is a schematic illustration of a computer system in accordance with an aspect.

The components shown in FIG. 9 for computer system (900) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various aspects of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An apparatus for video decoding, comprising:
processing circuitry configured to:
receive a bitstream including coded information of a current block in a current frame, the coded information indicating that (i) the current block is coded by an intra template matching prediction (intraTMP) mode or an intra block copy (IBC) mode and (ii) the current frame is a gradual decoding refresh (GDR) frame that includes a first area and a second area, the first area being independently coded and the second area being an area coded with dependency;
determine a search range of the intraTMP mode or the IBC mode such that the search range is only in the first area of the current frame;
determine a reference block from a plurality of candidate reference blocks in the search range; and
reconstruct the current block based on the determined reference block.

2. The apparatus of claim 1, wherein the processing circuitry is configured to:
when a first portion of an initial search range is included in the first area and a second portion of the initial search range is included in the second area, determine the search range as the first portion of the initial search range that is in the first area.

3. The apparatus of claim 1, wherein the processing circuitry is configured to:
when a first portion of an initial search range is included in the first area and a second portion of the initial search range is included in the second area,
extend the first portion of the initial search range along one of a width and a height of the initial search range in the first area; and
determine the search range as extended first portion of the initial search range.

4. The apparatus of claim 1, wherein the processing circuitry is configured to:
when a first portion of an initial search range is included in the first area and a second portion of the initial search range is included in the second area,
replace samples of the second portion of the initial search range with right-most samples in the first portion of the initial search range; and
determine the search range of the intraTMP mode or the IBC mode as the initial search range in which the samples of the second portion are replaced.

5. The apparatus of claim 2, wherein the first portion of the initial search range is positioned at one of a left side, a right side, a top side, and a bottom side of the second portion of the initial search range.

6. The apparatus of claim 1, wherein:
the coded information indicates that the current block is coded by the intraTMP mode, and
the processing circuitry is configured to:
when a first part of a template of the reference block is included in the first area of the current frame and a second part of the template of the reference block is included in the second area of the current frame,
calculate a template matching (TM) cost between the first part of the template of the reference block and a part of a template of the current block corresponding to the first part of the template of the reference block.

7. The apparatus of claim 1, wherein:
the coded information indicates that the current block is coded by the intraTMP mode, and
the processing circuitry is configured to:
when a part of a template of a first candidate reference block of the plurality of candidate reference blocks is included in the second area of the current frame,
determine a template matching (TM) cost between the template of the first candidate reference block and a template of the current block as a maximum TM cost in TM costs between templates of the plurality of candidate reference blocks and the template of the current block.

8. The apparatus of claim 1, wherein the processing circuitry is configured to:
determine the plurality of candidate reference blocks in the search range, each of the plurality of candidate reference blocks being included in the first area of the current frame, a template of each of the plurality of candidate reference blocks being included in the first area of the current frame.

9. A method of video encoding, comprising:
determining a first area and a second area of a current frame when the current frame is a gradual decoding refresh (GDR) frame, the first area being independently coded and the second area being coded with dependency;
when a current block in the current frame is coded by an intra template matching prediction (intraTMP) mode or an intra block copy (IBC) mode, determining a search range of the intraTMP mode or the IBC mode such that the search range is only in the first area of the current frame;
determining a reference block from a plurality of candidate reference blocks in the search range; and
encoding the current block in a bitstream based on the determined reference block.

10. The method of claim 9, wherein the determining the search range further comprises:
when a first portion of an initial search range is included in the first area and a second portion of the initial search range is included in the second area, determining the search range as the first portion of the initial search range that is in the first area.

11. The method of claim 9, wherein the determining the search range further comprises:
when a first portion of an initial search range is included in the first area and a second portion of the initial search range is included in the second area,
extending the first portion of the initial search range along one of a width and a height of the initial search range in the first area; and
determining the search range as extended first portion of the initial search range.

12. The method of claim 9, wherein the determining the search range further comprises:
when a first portion of an initial search range is included in the first area and a second portion of the initial search range is included in the second area,
replacing samples of the second portion of the initial search range with right-most samples in the first portion of the initial search range; and
determining the search range of the intraTMP mode or the IBC mode as the initial search range in which the samples of the second portion are replaced.

13. The method of claim 10, wherein the first portion of the initial search range is positioned at one of a left side, a right side, a top side, and a bottom side of the second portion of the initial search range.

14. The method of claim 9, wherein:
the current block is coded by the intraTMP mode, and
the determining the reference block further comprises:
when a first part of a template of the reference block is included in the first area of the current frame and a second part of the template of the reference block is included in the second area of the current frame,
calculating a template matching (TM) cost between the first part of the template of the reference block and a part of a template of the current block corresponding to the first part of the template of the reference block.

15. The method of claim 9, wherein:
the current block is coded by the intraTMP mode, and
the determining the reference block further comprises:
when a part of a template of a first candidate reference block of the plurality of candidate reference blocks is included in the second area of the current frame,
determining a template matching (TM) cost between the template of the first candidate reference block and a template of the current block as a maximum TM cost in TM costs between templates of the plurality of candidate reference blocks and the template of the current block.

16. The method of claim 9, wherein the determining the reference block further comprises:
determining the plurality of candidate reference blocks in the search range, each of the plurality of candidate reference blocks being included in the first area of the current frame, a template of each of the plurality of candidate reference blocks being included in the first area of the current frame.

17. A method of processing visual media data, the method comprising:
processing a bitstream of the visual media data according to a format rule, wherein:
the bitstream includes coded information of a current block in a current frame; and
the format rule specifies that:
the coded information indicates that (i) the current block is coded by an intra template matching prediction (intraTMP) mode or an intra block copy (IBC) mode and (ii) the current frame is a gradual decoding refresh (GDR) frame that includes a first area and a second area, the first area being independently coded and the second area being an area coded with dependency;
a search range of the intraTMP mode or the IBC mode is determined such that the search range is only in the first area of the current frame;
a reference block is determined from a plurality of candidate reference blocks in the search range; and
the current block is processed based on the determined reference block.

18. The method of claim 17, wherein the format rule specifies that:
when a first portion of an initial search range is included in the first area and a second portion of the initial search range is included in the second area, the search range is determined as the first portion of the initial search range that is in the first area.

19. The method of claim 17, wherein the format rule specifies that:
- when a first portion of an initial search range is included in the first area and a second portion of the initial search range is included in the second area,
  - the first portion of the initial search range is extended along one of a width and a height of the initial search range in the first area; and
  - the search range is determined as extended first portion of the initial search range.

20. The method of claim 17, wherein the format rule specifies that:
- when a first portion of an initial search range is included in the first area and a second portion of the initial search range is included in the second area,
  - samples of the second portion of the initial search range are replaced with right-most samples in the first portion of the initial search range; and
  - the search range of the intraTMP mode or the IBC mode is determined as the initial search range in which the samples of the second portion are replaced.

\* \* \* \* \*